(12) United States Patent
Guenzel et al.

(10) Patent No.: US 10,557,938 B2
(45) Date of Patent: Feb. 11, 2020

(54) SENSOR SYSTEM, MOTOR VEHICLE, AND METHOD FOR CLEANING AN ULTRASONIC SENSOR

(71) Applicants: VALEO Schalter und Sensoren GmbH, Bietigheim-Bissingen (DE); Volkswagen Aktiengesellschaft, Wolfsburg (DE)

(72) Inventors: Thorben Guenzel, Braunschweig (DE); Alice Frapsauce, Bietigheim-Bissingen (DE); Martin Winter, Berlin (DE); Jan Rotenburg, Stendal (DE)

(73) Assignees: VALEO Schalter und Sensoren GmbH, Bietigheim-Bissingen (DE); Volkswagen Aktiengesellschaft, Wolfsburg (DE)

( * ) Notice: Subject to any disclaimer, the term of this patent is extended or adjusted under 35 U.S.C. 154(b) by 320 days.

(21) Appl. No.: 15/711,508

(22) Filed: Sep. 21, 2017

(65) Prior Publication Data
US 2018/0081055 A1   Mar. 22, 2018

(30) Foreign Application Priority Data
Sep. 22, 2016 (DE) .................. 10 2016 117 879

(51) Int. Cl.
*G01S 15/93* (2006.01)
*G01S 7/52* (2006.01)
(Continued)

(52) U.S. Cl.
CPC ............ *G01S 15/931* (2013.01); *B60Q 9/008* (2013.01); *G01S 7/52001* (2013.01); *G01S 2007/52011* (2013.01)

(58) Field of Classification Search
CPC ............... G01S 15/931; G01S 7/52001; G01S 2007/52011; G01S 7/52004; G01S 7/521;
(Continued)

(56) References Cited

U.S. PATENT DOCUMENTS

| 4,404,541 A | 9/1983 | Kodera et al. |
| 2018/0081055 A1* | 3/2018 | Guenzel ............. G01S 7/52004 |

FOREIGN PATENT DOCUMENTS

| CN | 102455207 A | 5/2012 |
| CN | 107870325 A * | 4/2018 ......... G01S 7/52004 |

(Continued)

*Primary Examiner* — Daniel Pihulic
(74) *Attorney, Agent, or Firm* — Fitch, Even, Tabin & Flannery LLP

(57) ABSTRACT

The invention relates to a sensor system for distance measuring for a motor vehicle, comprising at least one ultrasonic sensor with a sensor housing and at least one membrane with a membrane diameter that is capable of being electrically stimulated into vibrations and a control unit for controlling the at least one membrane as well as for detecting vibrations of the at least one membrane, wherein the control unit is configured to stimulate in a measuring mode the at least one membrane into vibrations with a measuring frequency and a measuring amplitude. The control unit is configured to stimulate the at least one membrane in a cleaning mode into such vibrations that the sensor housing is set into vibrations with a housing amplitude that amounts to at least 1% of the membrane diameter. Further, the invention relates to a motor vehicle and a method for cleaning an ultrasonic sensor.

10 Claims, 3 Drawing Sheets

(51) Int. Cl.
 *B60Q 9/00* (2006.01)
 *G01S 15/931* (2020.01)
(58) Field of Classification Search
 CPC .......... B60Q 9/008; H04R 17/10; H04R 7/00;
 B60S 1/566
 See application file for complete search history.

(56) References Cited

FOREIGN PATENT DOCUMENTS

| | | | | |
|---|---|---|---|---|
| DE | 3126161 | A1 | 3/1982 | |
| DE | 10323063 | A1 | 12/2004 | |
| DE | 102013011186 | A1 | 1/2014 | |
| DE | 102016117879 | A1 * | 3/2018 | ......... G01S 7/52004 |

* cited by examiner

SENSOR SYSTEM, MOTOR VEHICLE, AND METHOD FOR CLEANING AN ULTRASONIC SENSOR

FIELD

The present invention relates to a sensor system with a cleaning mode for self-cleaning, a motor vehicle with a sensor system according to the invention as well as a method for cleaning an ultrasonic sensor of a sensor system.

BACKGROUND

Known sensor systems for motor vehicles frequently comprise ultrasonic sensors, such as for instance PDC/PLA sensors and are often employed in various driver assistance systems, such as in particular PDA, PLA, IPA, RPA or the like.

Traditional ultrasonic sensors have a membrane, which is capable of being put into ultrasonic vibrations for emitting an ultrasonic signal by means of a control unit. Further, the membrane is configured to be stimulated by an ultrasonic signal into vibrations that can be captured by the control unit. The emitted ultrasonic signal in this connection is emitted as pulse signal so that the reflected signal is capable of being captured by the membrane. In this way ultrasonic signals emitted by the ultrasonic sensor and reflected by an object can be detected. For protection against external influences, such as e.g. dirt, water, snow, ice, mechanical stresses, or the like, ultrasonic sensors have a sensor housing, which surrounds the membrane as well as possibly further sensitive components of the ultrasonic sensor.

A motor vehicle in operation is regularly exposed to different environmental factors, such as for instance different temperatures, humidity, dirt, or the like. Hereby the sensor housing can be soiled by deposits, in particular of ice, snow, dust, or the like. During driving on a road covered in snow for instance due to the tail turbulences deposits of snow on a tail bumper of the motor vehicle may occur. Ultrasonic sensors mounted in the tail bumper can be soiled or blocked by these snow deposits. When subsequently driving behind a motor vehicle that is driving in front, the tail turbulences of the motor vehicle driving in front can cause snow deposits on a front bumper of the following motor vehicle and thus soil or block the installed ultrasonic sensors.

Such pollutions or blockages of ultrasonic sensors lead to it that an outwardly propagating sound pressure of the ultrasonic sensor is reduced so that an obstacle detection is only to a limited extent possible or not possible at all any more. Further, such pollutions can cause a deception of the ultrasonic sensor so that the ultrasonic sensor detects a close obstacle for instance due to the pollution even if such an obstacle is not present at all. In the extreme case a permanent presence of an obstacle is detected independently of whether or not the obstacle is in actual fact present or not.

A reliable support of a driver of the motor vehicle by the corresponding driver assistance system is thus not guaranteed any longer. Further, such misinformation may confuse or irritate the driver and considerably increase the risk of an accident.

In order to provide relief in such a state, the ultrasonic sensors need to be cleaned. This can for instance be effected manually by the driver or automatically by means of a cleaning device. For this purpose ultrasonic sensors have been developed, which besides an emitting of pulse signals are configured for emitting heat. Such an ultrasonic sensor is known from the DE 10 2013 011 186 A1. The heat can be generated via a heating device as well as the emitting of permanent signals by the membrane of the ultrasonic sensor. The generated heat causes a melting of the snow or ice sticking to the sensor housing. Disadvantageous are a high energy consumption and a high thermal stress on the ultrasonic sensor. Further, various pollutions, such as for instance dust, cannot be removed by means of such ultrasonic sensors.

It is therefore the object of the present invention to create a sensor system, a motor vehicle, as well as a method for cleaning an ultrasonic sensor of a sensor system for a motor vehicle, which remove previously named disadvantages or at least partly remove them. Accordingly, it is the task of the present invention to provide a sensor system for a motor vehicle, a motor vehicle, as well as a method for cleaning an ultrasonic sensor of a sensor system for a motor vehicle, which allow in a simple and low-cost manner for an improved cleaning of the ultrasonic sensor involving reduced energy expense as well as low stress on the ultrasonic sensor.

SUMMARY

The afore-mentioned task is solved by the patent claims. Thus, the task is solved by a sensor system for distance measuring for a motor vehicle according to the independent claim 1, a motor vehicle according to the independent claim 8, as well as a method for cleaning an ultrasonic sensor according to the independent claim 9. Further features and details of the invention derive from the subclaims, the description, and the drawings. In this connection features and details described in connection with the inventive sensor system for distance measuring for a motor vehicle, of course also apply in connection with the motor vehicle according to the invention and the method according to the invention and each vice versa so that as far as the disclosure is concerned reference is invariably made or can be made mutually to the individual inventive aspects.

According to a first aspect of the invention, the task is solved by a sensor system for distance measuring for a motor vehicle. The sensor system comprises at least one ultrasonic sensor and one control unit. The at least one ultrasonic sensor comprises a sensor housing and at least one membrane that is capable of being stimulated into vibrations having a membrane diameter. The control unit is configured for controlling the at least one membrane as well as for detecting vibrations of the at least one membrane. Further, the control unit is configured to stimulate in a measuring mode the at least one membrane into vibrations with a measuring frequency and a measuring amplitude. According to the invention the control unit is further configured to stimulate the at least one membrane in a cleaning mode into such vibrations so that the sensor housing is set into vibrations with a housing amplitude, the membrane diameter of which is at least 1%.

An inventive sensor system for distance measuring within the scope of the invention relates to an assembly group, which is configured for emitting and detecting ultrasonic waves in a measuring mode. For this purpose the sensor system comprises at least one ultrasonic sensor as well as a control unit for controlling or actuating the ultrasonic sensor as well as preferably for analyzing detected sound waves. The analyzing is effected for instance by time measurement between the emitting and detecting of an ultrasonic signal pulse. Since ultrasonic waves propagate at sonic speed, by measuring this period a distance of an object reflecting the ultrasonic waves from the ultrasonic sensor can be determined by way of computing. It may be envisaged according to the invention that the control unit is configured for this determination. Alternatively, one or several functions of the control unit can be effected by means of a board computer of the motor vehicle. According to the invention this is tantamount to the fact that the control unit is entirely or partly integrated within the board computer.

The ultrasonic sensor comprises a membrane that is capable of being stimulated into vibrations, in particular into ultrasonic vibrations, with a measuring frequency as well as a measuring amplitude, which is surrounded by a sensor housing and thus protected against external influences. The sensor housing may also comprise one or several openings, which, in the installed state, for instance in a bumper of the motor vehicle, is protected against external influences. A part of the sensor housing, which for instance is referred to as sensor housing window, in the installed state is directed at an external environment of the motor vehicle or into a detection direction of the ultrasonic sensor. This sensor housing window thus is exposed to environmental influences and can therefore for instance be soiled or blocked. Insofar as within the scope of the invention a soiling or cleaning of the sensor housing is described, this refers in particular to the sensor housing window.

Moreover, the membrane is capable of being stimulated into vibrations that in turn cause such a vibration of the sensor housing with a housing amplitude that amounts to at least 1% of the membrane diameter. Such vibrations of the sensor housing accordingly are essentially larger than in the measuring operation, in which nearly no perceivable vibrations occur at the sensor housing.

The relatively strong vibrations at the sensor housing have the advantageous effect that deposits or pollutions can be removed from the sensor housing or that such deposits and pollutions can be efficiently avoided in a simple and energy-efficient manner. Further, such vibrations have the advantage that at the ultrasonic sensor no excessive heating must occur or occurs and that same thus does not become hot. Hereby a durability of the ultrasonic sensor over common cleaning systems is improved.

According to the invention it may be envisaged in a sensor system that the control unit is configured to stimulate the at least one membrane in the cleaning mode into vibrations with a cleaning frequency, wherein the cleaning frequency is closer to a resonance frequency of the sensor housing of the ultrasonic sensor than the measuring frequency. The cleaning frequency in this connection is preferably lower than the measuring frequency. Preferably the cleaning frequency in the ultrasonic range, however, can theoretically also be in the audible range or in the infrasound range. Such a cleaning frequency has the advantage that a vibrating of the sensor housing can be stimulated easily and energy-efficiently.

Further preferably the cleaning frequency corresponds to the resonance frequency of the sensor housing or corresponds to the resonance frequency at least essentially. A cleaning frequency that is approximated to the resonance frequency of the sensor housing has the advantage that also with small cleaning amplitudes large housing amplitudes can be achieved. Relatively large housing amplitudes have the advantage that deposits can be better removed from the sensor housing. The cleaning of the ultrasonic sensor thus can be effected more efficiently.

Preferably the control unit is configured to stimulate the at least one membrane in the cleaning mode into vibrations with a cleaning amplitude, wherein the cleaning amplitude is larger than the measuring amplitude. By means of a large cleaning amplitude a cleaning of the ultrasonic sensor can be improved. In this connection the cleaning amplitude can preferably be selected in such a way that no excessive heating of the ultrasonic sensor occurs.

It is preferred that the cleaning amplitude is at least double the size of the measuring amplitude. By means of such cleaning amplitude a cleaning of the ultrasonic sensor in comparison with lower cleaning amplitudes can be improved.

According to a preferred further development of the invention in a sensor system it may be envisaged that the sensor system has a bearing device for attachment to the motor vehicle, wherein the sensor housing within the bearing device is mounted in a swinging manner. A bearing device within the scope of the invention is a device that fixes a relative position between two components and therein allows for a relative movement between the two components. Preferably the bearing device is configured as vibration sleeve for receiving the sensor housing. The bearing device preferably has an elastic material, in particular a resilient material. Further preferably the bearing device has an attenuating material, in order to avoid or attenuate an undesired overswing of the ultrasonic sensor in the cleaning mode and/or to attenuate a swinging of the ultrasonic sensor in the measuring mode. The sensor housing thus is surrounded or at least partly surrounded by the vibration sleeve. The bearing device can be mounted at a mounting place on the motor vehicle in such a way that the ultrasonic sensor is mounted via the bearing device on the motor vehicle. In the mounted state the bearing device thus facilitates or favors a relative vibration of the sensor housing relative to the motor vehicle. This has the advantage that an energy expense required for cleaning the ultrasonic sensor is essentially reduced.

Preferably the bearing device has an elastomer or is formed from an elastomer. Elastomers have the advantage that same are available easily and at low cost and are easy to process. By means of an elastomer relative vibrations of the sensor housing held to the bearing device relative to the motor vehicle can be favored. Further, elastomers have the advantage that hereby a sealing of the ultrasonic sensor against the bearing device can be improved.

According to a second aspect of the invention the task is solved by a motor vehicle with a sensor system for distance measuring according to the invention. The motor vehicle has preferably several ultrasonic sensors, which in particular are distributed across the bumpers. The control unit in this connection is for instance configured as a separate unit or as part of a board computer of the motor vehicle.

The motor vehicle according to the invention has the same advantages as already described previously with regard to the sensor system according to the invention. So the motor vehicle according to the invention has the advantage that deposits or pollutions can be efficiently removed from the sensor housing by means of relatively strong vibrations of the sensor housing in a simple and energy-saving way or can be avoided. Further the motor vehicle has the advantage that by the vibrations in the cleaning operation at the ultrasonic sensor no excessive heating must occur or occurs and same thus does not become hot. Hereby a duration of the ultrasonic sensor in comparison with common cleaning systems is improved.

According to a third aspect of the invention the task is solved by a method for cleaning an ultrasonic sensor of a sensor system according to the invention. The method includes the following steps:

initiating a cleaning mode of the at least one ultrasonic sensor by the control unit, putting the at least one membrane of the at least one ultrasonic sensor by means of the control unit into such vibrations that the sensor housing is stimulated into vibrations with a housing amplitude that amounts to at least 1% of the membrane diameter, and completing of the cleaning mode by the control unit.

To start with the cleaning process is initiated by the control unit. This can be effected on the basis of various factors, such as for instance an input by the driver, a reaching of a predefined point in time, a detected error notification of at least one ultrasonic sensor of the motor vehicle or the like. The predefined point in time can for instance be defined in dependence on an operating time of the motor vehicle and/or a point in time of a previous cleaning of the ultrasonic sensors and/or a selection of the driver.

Upon initiated cleaning mode the membrane by means of the control unit is put into such vibrations that hereby the sensor housing is stimulated into vibrations with a housing amplitude amounting at least to 1% of the membrane diameter. Such vibrations cause an effective cleaning of the sensor housing. For an effective cleaning it is preferred if the membrane in the cleaning mode is stimulated over a longer period of time into vibrations than in the measuring mode. Further preferably the cleaning is effected in cycles with interruptions in order to thus avoid an excessive heating of the ultrasonic sensor. In the case of several ultrasonic sensors it is preferred if the ultrasonic sensors are cleaned at different points in time in order to ensure a measuring mode of the ultrasonic sensors, which are not in the cleaning mode at this point in time. Thus a reliability of various driver assistance systems can be improved.

Subsequently, the cleaning mode is completed by the control unit. The completion can be effected according to several criteria. For instance a length of a cleaning cycle can be predefined or predetermined by the driver. Preferably it is envisaged that the cleaning mode is only temporarily completed and a sensor test is effected. If the sensor test determines a blocked or soiled ultrasonic sensor, the cleaning mode can be continued.

According to the invention the method for cleaning an ultrasonic sensor has the same advantages as already previously described in connection with the sensor system according to the invention as well as the motor vehicle according to the invention. Accordingly the method according to the invention has the advantage that deposits or pollutions by means of relatively strong vibrations can be effectively removed from the sensor housing or be avoided in a simple and energy-saving way. Further, the method has the advantage that by way of vibrations during the cleaning process at the ultrasonic sensor no excessive heating must occur or occurs and same thus does not become hot. Hereby a duration of the ultrasonic sensor is improved in comparison with conventional cleaning systems.

Preferably an external temperature and/or a vehicle speed are determined by the control unit, wherein the cleaning mode is only initiated, if the outer temperature is less than 4° C. and/or the vehicle speed amounts to at least 5 km/h. The determining of the external temperature can for instance be effected via a temperature sensor of the sensor system. Alternatively or additionally the determining of the external temperature can be effected by retrieving the external temperature by the board computer or by a separate temperature measuring system of the motor vehicle. The determining of the vehicle speed can for instance be effected via a speed sensor of the sensor system. Alternatively or additionally, the determining of the vehicle speed can be effected by retrieving the vehicle speed by the board computer or by a separate speed measuring system of the motor vehicle. A cleaning of the sensors at external temperatures below 4° C. has the advantage that the danger of an icing or of snow deposits on the sensor housing is particularly great at these temperatures. Hereby a total cleaning effort and thus an involved energy consumption can be reduced. A cleaning of the sensors at a vehicle speed of at least 5 km/h has the advantage that a precise distance measurement, as for instance required for parking, is not necessary. Thus, the driver assistance systems of the motor vehicle are not or only slightly affected by the cleaning.

Further, it may be envisaged that the cleaning mode is not initiated until no further motor vehicles are detected within a predetermined distance from the motor vehicle in order to avoid an interference of foreign driver assistance systems.

BRIEF DESCRIPTION OF THE DRAWINGS

In the following the sensor system according to the invention, the vehicle according to the invention and the method according to the invention are explained in more detail on the basis of drawings. Identical features in the figures invariably have the same reference signs. Schematically it is shown in.

DESCRIPTION OF PREFERRED EMBODIMENTS

Figure 1:
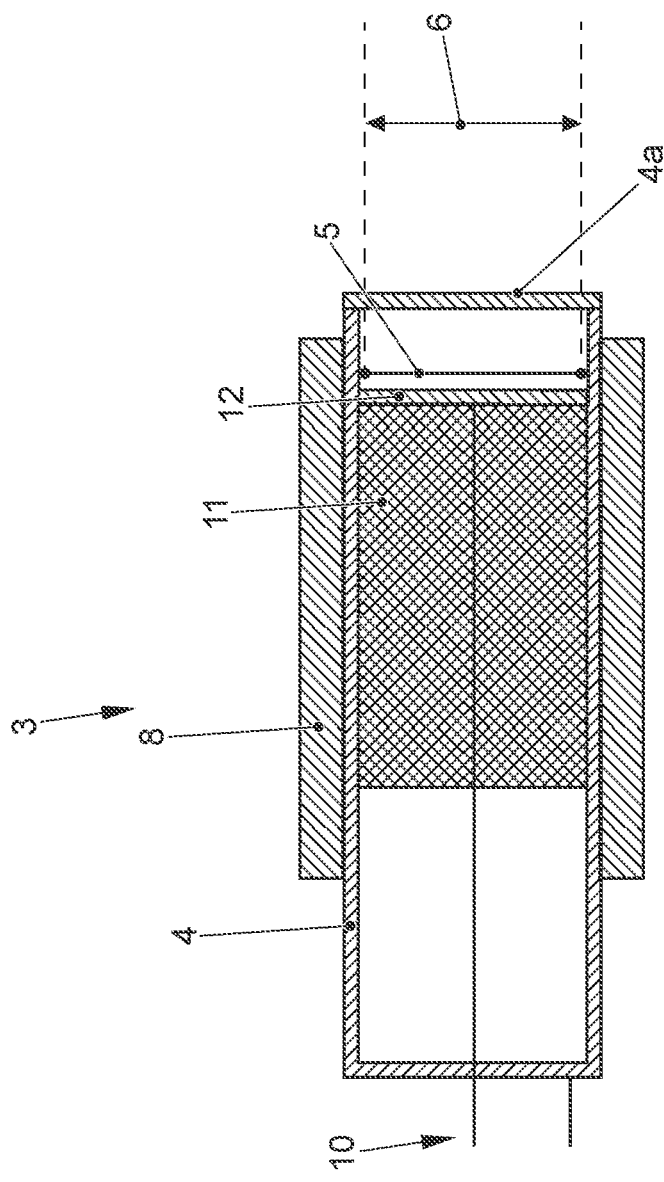
FIG. 1 in a lateral view a preferred embodiment of an ultrasonic sensor of the sensor system according to the invention, FIG. 2 in a plan view a preferred embodiment of a motor vehicle according to the invention with a sensor system according to the invention, and FIG. 3 in a flow chart a preferred embodiment of the method according to the invention.

FIG. 1 shows a preferred embodiment of an ultrasonic sensor 3 of a sensor system 1 according to the invention (cf. FIG. 2) schematically in a lateral view. The ultrasonic sensor 3 has a sensor housing 4, in which a membrane 5 with a membrane diameter 6 is held in a way that it is capable of swinging. For stimulating the membrane into vibrations within the sensor housing 4 and adjacent to the membrane 5 a piezo element 12 is arranged. On a side facing away from the membrane 5 the piezo element 12 an attenuator element 11 for attenuating the vibrations of the piezo element 12 is arranged. The ultrasonic sensor 3 has two electric connectors 10, which are arranged laterally on the sensor housing. For protecting the membrane 5 against external influences the sensor housing 4 has a sensor housing window 4a, which is permeable to ultrasonic waves. Alternatively membrane 5 and sensor housing window 4a can also be configured as a single piece. In order to improve a relative swinging of the sensor housing 4 relative to a motor vehicle 2 (cf. FIG. 2), the ultrasonic sensor 3 has a bearing device 8, which is configured as swinging bushing. The sensor housing 4 is received within the /bearing device 8 and held by it. The bearing device 8 is capable of being fixed to the motor vehicle and has an elastic part, which allows for a relative swinging of the sensor housing 4 relative to the motor vehicle 2. The ultrasonic sensor 3 thus in a cleaning mode can be put into such vibrations that deposits, such as for instance snow, dust, or the like, on the sensor housing 4, in particular on the sensor housing window 4a, can hereby be shaken off.

Figure 2:
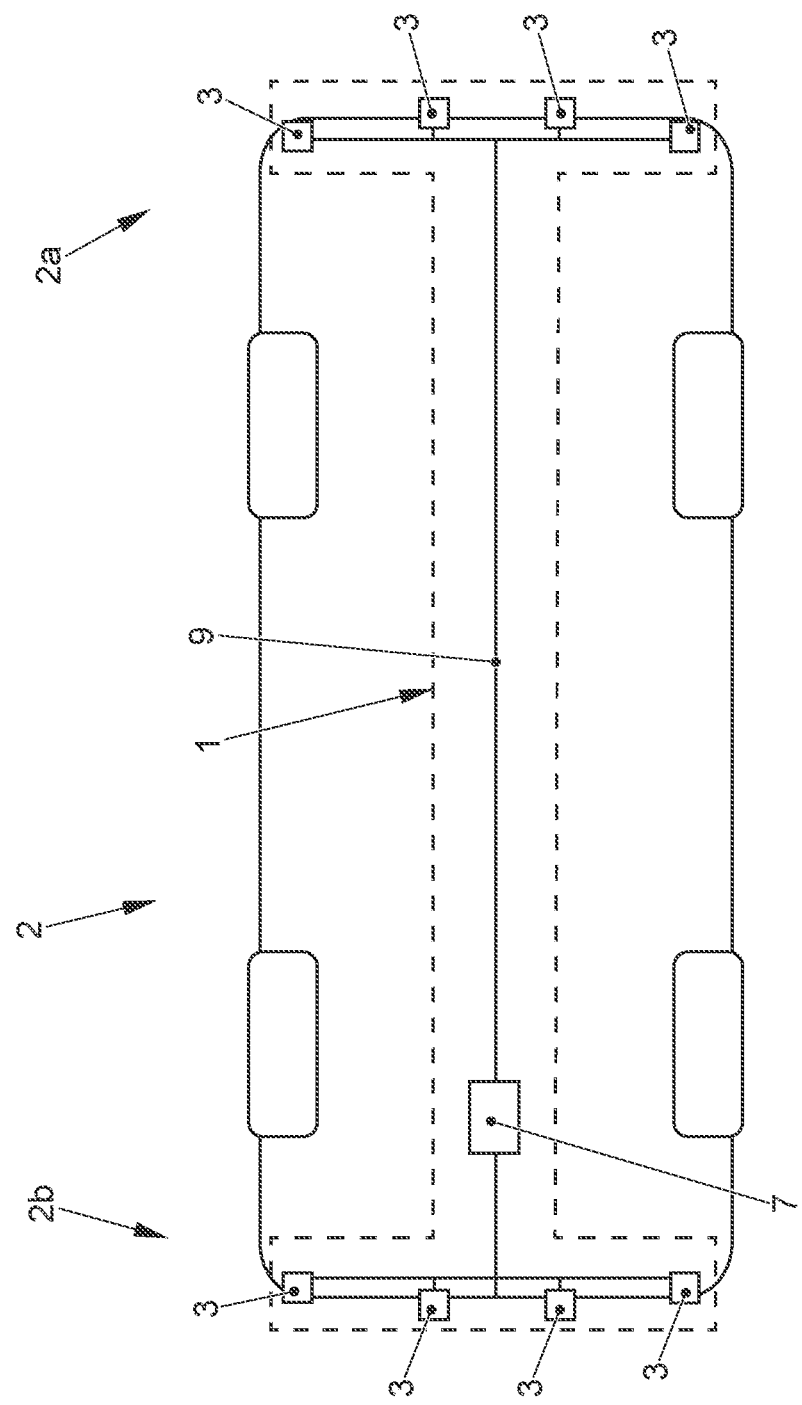

In FIG. 2 a preferred embodiment of a motor vehicle 2 according to the invention is represented schematically in a plan view. The motor vehicle 2 comprises a sensor system 1 according to the invention with a control unit 7 and eight ultrasonic sensors 3, wherein in each case four ultrasonic sensors 3 are arranged on a vehicle tail 2a as well as on a vehicle front 2b. The ultrasonic sensors 3 are coupled with the control unit 7 via connection lines 9 and thus capable of being stimulated by the control unit 7 into emitting ultrasonic waves in a measuring mode as well as into swinging in a cleaning mode. Further, the control unit 7 is configured to capture vibrations of the membranes 5 of the ultrasonic sensors 3 and thus to compute by time measurement a distance of the ultrasonic sensors 3 from an object.

Figure 3:
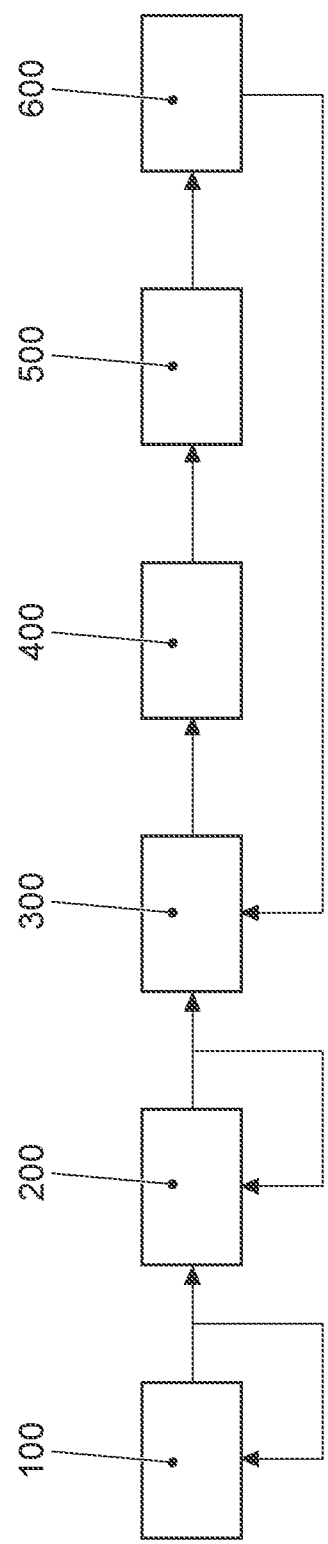

FIG. 3 shows in a flow chart a preferred embodiment of the method according to the invention for cleaning an ultrasonic sensor (3) of a sensor system (1) according to the invention. In a first method step 100 an external temperature is determined, for instance measured or retrieved by a board computer. If the determined external temperature amounts to at least 4° C., the first method step 100 is repeated. The repeating can also be effected delayed, in particular if the determined external temperature amounts to clearly over 4° C. and it is not to be reckoned with a strong drop in temperature. If the determined external temperature amounts to below 4° C., a second method step 200 is introduced. In case another pollution of the ultrasonic sensor 3, for instance by dust, is to be removed, the first method step 100 can alternatively also be omitted.

In the second method step 200 a speed of the motor vehicle 2 is determined, for instance measured or retrieved from a board computer. If the determined speed is less than 5 km/h, the second method step 200 is repeated. If the determined speed amounts to at least 5 km/h, a third method step 300 is introduced. Alternatively the first method step 100 and the second method step 200 can also be performed parallely, wherein the third method step 300 is not introduced until the determined external temperature amounts to below 4° C. and the determined speed is at least 5 km/h.

In the third method step 300 a cleaning mode of the ultrasonic sensor 3 or the ultrasonic sensors 3 is initiated. In the case of a sensor system 1 with several ultrasonic sensors 3 it may be envisaged that in at least one ultrasonic sensor 3 the cleaning mode is initiated, whilst in at least one other ultrasonic sensor 3 the cleaning mode is not initiated. In this case a cleaning mode could possibly equally as well be effected independently of the vehicle speed, that is omitting the second method step 200. In this connection it is to be seen to it that an ultrasonic sensor 3 in the cleaning mode does not interfere with an ultrasonic sensor 3 in the measuring mode. This can for instance be effected by means of a different cleaning frequency and measuring frequency.

In a fourth method step 400 the at least one membrane 5 of the at least one ultrasonic sensor 3 is set into vibrations by means of the control unit 7. The vibrations of the membrane 5 are such that hereby the sensor housing 4 is stimulated into vibrations with a housing amplitude amounting to at least 1% of the membrane diameter 6. By such housing vibration dirt remainders on the sensor housing 4, in particular on the sensor housing window 4a, are thus shaken off and the ultrasonic sensor 3 thus cleaned. In a subsequent fifth method step 500 the cleaning mode is completed by the control unit 7.

According to the invention it may be envisaged that after a fifth method step 500 a sixth method step 600 occurs, in which the cleaned ultrasonic sensor 3 is tested in a measuring mode or testing mode for the presence of further pollutions. This can be done for instance by emitting an ultrasonic signal according to a normal measuring mode. The immediate receiving of an echo of the ultrasonic signal corresponding to a detection of an object immediately adjacent the ultrasonic sensor 3 for instance is indicative of the presence of a pollution. In particular if the sixth method step 600 in the driving mode is performed at speeds of over 5 km/h, the certainty of such a diagnosis is improved. This effect in the case of further rising speeds is further increased, since the probability of an object immediately adjacent the vehicle, in particular in driving direction, decreases with increasing speed for avoiding a danger of collision. Alternatively or additionally the sixth method step 600 can be arranged before the remaining method steps, in order to perform these method steps as needed only in the case of a presence of a pollution of at least one of the ultrasonic sensors 3. Preferably the cleaning is effected only with ultrasonic sensors 3, in which a pollution has been detected.

The invention claimed is:

1. A sensor system for distance measuring for a motor vehicle, comprising:
   at least one ultrasonic sensor with a sensor housing and at least one membrane with a membrane diameter that is capable of being electrically stimulated into vibrations, and
   a control unit for controlling the at least one membrane and for detecting vibrations of the at least one membrane, wherein the control unit is configured to stimulate in a measuring mode the at least one membrane into vibrations with a measuring frequency and a measuring amplitude,
   characterized in that
   the control unit is configured to stimulate the at least one membrane in a cleaning mode into such vibrations that the sensor housing is put into vibrations with a housing amplitude that amounts to at least 1% of the membrane diameter.

2. The sensor system according to claim 1, characterized in that
   the control unit is configured to stimulate the at least one membrane in the cleaning mode into vibrations with a cleaning frequency, wherein the cleaning frequency is closer to a resonance frequency of the sensor housing of the ultrasonic sensor than the measuring frequency.

3. The sensor system according to claim 2, characterized in that
   the cleaning frequency corresponds to or essentially corresponds to the resonance frequency of the sensor housing.

4. The sensor system according to claim 1, characterized in that
   the control unit is configured to stimulate the at least one membrane in the cleaning mode into vibrations with a cleaning amplitude, wherein the cleaning amplitude is larger than the measuring amplitude.

5. The sensor system according to claim 4, characterized in that
   the cleaning amplitude is at least double the size of the measuring amplitude.

6. The sensor system according to claim 1, characterized in that
   the sensor system comprises a bearing device for attaching to the motor vehicle, wherein the sensor housing is mounted in the bearing device in a swinging manner.

7. The sensor system according to claim 6, characterized in that the bearing device comprises an elastomer or is formed from an elastomer.

8. A motor vehicle comprising a sensor system for distance measuring, wherein the sensor system comprises:

at least one ultrasonic sensor with a sensor housing and at least one membrane with a membrane diameter that is capable of being electrically stimulated into vibrations, and a control unit for controlling the at least one membrane and for detecting vibrations of the at least one membrane, wherein the control unit is configured to stimulate in a measuring mode the at least one membrane into vibrations with a measuring frequency and a measuring amplitude, characterized in that the control unit is configured to stimulate the at least one membrane in a cleaning mode into such vibrations that the sensor housing is put into vibrations with a housing amplitude that amounts to at least 1% of the membrane diameter.

9. A method for cleaning an ultrasonic sensor of a sensor system, the method comprising:

providing a sensor system for distance measuring for a motor vehicle, comprising:

at least one ultrasonic sensor with a sensor housing and at least one membrane with a membrane diameter that is capable of being electrically stimulated into vibrations, and a control unit for controlling the at least one membrane and for detecting vibrations of the at least one membrane, wherein the control unit is configured to stimulate in a measuring mode the at least one membrane into vibrations with a measuring frequency and a measuring amplitude, characterized in that the control unit is configured to stimulate the at least one membrane in a cleaning mode into such vibrations that the sensor housing is put into vibrations with a housing amplitude that amounts to at least 1% of the membrane diameter;

initiating a cleaning mode of the at least one ultrasonic sensor by the control unit;

putting the at least one membrane of the at least one ultrasonic sensor by operation of the control unit into such vibrations that hereby the sensor housing is stimulated into vibrations with a housing amplitude that amounts to at least 1% of the membrane diameter; and completing of the cleaning mode by the control unit.

10. The method according to claim 9, characterized in that an external temperature and/or a vehicle speed of the control unit are determined, wherein the cleaning mode is only initiated if the external temperature is less than 4° C. and/or the vehicle speed amounts to at least 5 km/h.

\* \* \* \* \*